US009514359B2

(12) United States Patent
Mitchell et al.

(10) Patent No.: US 9,514,359 B2
(45) Date of Patent: Dec. 6, 2016

(54) CARD ART DISPLAY (71) Applicant: GOOGLE INC., Mountain View, CA (US)

(72) Inventors: Marcus Quintana Mitchell, New York, NY (US); Peter Hazlehurst, Foster City, CA (US); Xiaohang Wang, Jersey City, NJ (US); Debra Lin Repenning, Riverside, CT (US); Yakov Okshtein, Far Rockaway, NY (US); Sanjiv Kumar, White Plains, NY (US); Farhan Shamsi, Rego Park, NY (US); Henry Allan Rowley, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 79 days.

(21) Appl. No.: 13/947,020

(22) Filed: Jul. 19, 2013

(65) Prior Publication Data

US 2015/0023604 A1 Jan. 22, 2015

(51) Int. Cl.
*G06K 9/64* (2006.01)
*G06K 9/00* (2006.01)

(52) U.S. Cl.
CPC ....... *G06K 9/00536* (2013.01); *G06K 9/00449* (2013.01); *G06K 9/00483* (2013.01)

(58) Field of Classification Search
None
See application file for complete search history.

(56) References Cited

U.S. PATENT DOCUMENTS

| 8,612,854 B2 * | 12/2013 | Eisen ................ H04N 1/00864 |
| | | 715/221 |
| 2012/0099780 A1 | 4/2012 | Smith et al. |
| 2012/0143760 A1 * | 6/2012 | Abulafia et al. ................ 705/44 |
| 2012/0252360 A1 * | 10/2012 | Adams ................ H04B 5/0062 |
| | | 455/41.1 |
| 2013/0004076 A1 | 1/2013 | Koo et al. |

(Continued)

FOREIGN PATENT DOCUMENTS

| JP | 2005-100383 A | 4/2005 |
| WO | 2015/009974 A2 | 1/2015 |
| WO | 2015/009974 A3 | 1/2016 |

OTHER PUBLICATIONS

Title: Understanding Optical Character Recognition (OCR) Publ: www.adcnordic.com/news/ocr.php pp. 1-7 Date: Jan. 1, 2002.

(Continued)

*Primary Examiner* — Kim Vu
*Assistant Examiner* — Fred Hu
(74) *Attorney, Agent, or Firm* — Johnson, Marcou & Issacs, LLC (57) ABSTRACT Providing improved card art for display comprises receiving, by one or more computing devices, an image of a card and performing an image recognition algorithm on the image. The computing device identifies images represented on the card image and comparing the identified images to an image database. The computing device determines a standard card art image associated with the identified image based at least in part on the comparison and associates the standard card art image with an account of a user, the account being associated with the card in the image. The computing device displays the standard card art as a representation of the account.

20 Claims, 6 Drawing Sheets (56) References Cited

U.S. PATENT DOCUMENTS

2013/0022231 A1    1/2013   Nepomniachtchi et al.
2013/0166402 A1*   6/2013   Parento et al. ................. 705/21
2014/0052636 A1*   2/2014   Mattes ................. G06Q 20/409
                                                                                                               705/44

OTHER PUBLICATIONS

Author: Datta, K. Title: Credit Card Processing Using Cell Phone Images pp. 1-7 Date: Jan. 1, 2011.
Author: Jacob, S. Title: Identification Numbers and Check Digit Algorithms Publ: www.codeproject.com/Articles/459507/Identification-numbers- pp. 1-11 Date: Sep. 20, 2012.
Bai, International Preliminary Report on Patentability issued in International Application No. PCT/US2014/047102, mailed on Jan. 28, 2016, 8 pages.
Kang, International Search Report and Written Opinion issued in International Application No. PCT/US2014/047102, mailed on Nov. 19, 2015, 11 pages.

* cited by examiner

CARD ART DISPLAY

TECHNICAL FIELD

The technology disclosed herein pertains to financial card display, and more particularly to allowing a user device to access high-quality, redacted card art.

BACKGROUND

In a conventional digital wallet application, the user computing device does not display the art associated with the physical payment account. The art may be a representation of the face of a physical card that is typically associated with the payment instrument, such as a credit card. Some physical cards have art that varies based on the level of the user. For example, a user that has a higher credit level with a credit card may have a "gold" or "platinum" credit card, and the associated physical card can have art associated with the different levels. Physical loyalty cards can have similar levels of art associated with the user status. Other physical cards can have varying card art.

If a digital wallet application attempts to obtain and display an image of the user card, the image may contain personal user information such as the name of the user and the user identification number.

Conventional digital wallet applications do not allow a user to access the payment instrument art during an optical scan of a physical card and then display appropriate art on the user computing device.

SUMMARY

The technology of the present disclosure includes computer-implemented methods, computer program products, and systems to provide improved card art for display. Providing improved card art for display comprises receiving, by one or more computing devices, an image of a card; performing an image recognition algorithm on the image; identifying images represented on the card image; comparing the identified images to an image database; determining a standard card art image associated with the identified image based at least in part on the comparison; associating the standard card art image with an account of a user, the account being associated with the card in the image; and displaying the standard card art as a representation of the account.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Embodiments herein provide computer-implemented techniques for allowing a user to display card art on a user computing device. An optical character recognition ("OCR") application receives a scan or other image from a camera and stores the image. The OCR application extracts the card information using an OCR algorithm for use in a digital wallet application module, a point of sale ("POS") terminal transaction, or other suitable use. The user may desire to display an image of the physical card on the user computing device, a POS terminal, an online transaction website, or on any suitable user interface. The OCR application may use the image from the OCR process to prepare a card image. The displayed card art may be a redacted version of the card image. The displayed card art may alternatively be a high quality version of the card art that is obtained from the issuer of the card or another suitable location.

Throughout the specification, the general term "card" will be used to represent any type of physical card instrument, such as a magnetic stripe card, or a representation thereof, such as a card displayed on a screen or piece of paper. In example embodiments, the different types of card represented by "card" can include credit cards, debit cards, stored value cards, loyalty cards, identification cards, or any other suitable card representing an account of a user or other information thereon. Examples using cards may be applied to the images of other items, such as receipts, boarding passes, tickets, and other suitable items. In certain examples, the card may be a facsimile of a card, such as a photocopy or an image on a display screen.

The user may employ the card when making a transaction, such as a purchase, ticketed entry, loyalty check-in, or other suitable transaction. The user may obtain the card information for the purpose of importing the account represented by the card into a digital wallet application module of a computing device or for other digital account purposes. The card is typically a plastic card containing the account information and other data on the card. In many card embodiments, the customer name, expiration date, and card numbers are physically embossed on the card. The embossed information is visible from both the front and back of the card, although the embossed information is typically reversed on the back of the card.

A user may desire to enter the information from the card into a user computing device or other computing device, for example, to conduct an online purchase, to conduct a purchase with a mobile computing device or other computing device, to add the information to a wallet application on a computing device, or for any other suitable reason. In an example, the user desires to use a mobile computing device to conduct a purchase transaction using a digital wallet application module executing on the mobile computing device. The digital wallet application module may require an input of the details of a particular user payment account to conduct a transaction with the particular user payment account or to set up the account. Due to the small screen size and keyboard interface on a mobile device, such entry can be cumbersome and error prone for manual input. Additionally, a merchant system may need to capture card information to conduct a transaction or for other reasons.

In addition to account identifiers, the front of the card typically contains one or more of logos of the issuer of the card, pictures chosen by the user or the issuer, other text describing the type or status of the user account, a security code, and other marketing and security elements, such as holograms or badges. The user name, card expiration date, and the account identifier, such as a credit card number, may be embossed on the front of the card such that the information protrudes from the front of the card.

The user employs a mobile phone, digital camera, or other user computing device to capture an image of the card associated with the account that the user desires to input into the user computing device.

An OCR application on the user computing device receives the image of the card. The image may be obtained from the camera module of a user computing device, such as the camera on a mobile phone. The image may be obtained from a scanner coupled to the user computing device or any other suitable digital imaging device. The image may be obtained from video captured by the user computing device. The image may be accessed by the OCR application on the user computing device from a storage location on the user computing device, from a remote storage location, or from any suitable location. All sources capable of providing the image will be referred to herein as a "camera."

An OCR application receives the images of the card from the camera. The functions of the OCR application may be performed by any suitable module, hardware, software, or application operating on the user computing device. Some, or all, of the functions of the OCR application may be performed by a remote server or other computing device, such as the server operating in an OCR system. For example, a digital wallet application module on the user computing device may obtain the images of the card and transmit the images to the OCR system for processing. In another example, some of the OCR functions may be conducted by the user computing device and some by the OCR system or another remote server. Examples provided herein may indicate that many of the functions are performed by an OCR application on the user computing device, but some or all of the functions may be performed by any suitable computing device.

In certain example embodiments, the image is presented on the user interface of the user computing device as a live video image of the card while the user manipulates the camera of the computing device to capture the digital image of the card. The OCR application can isolate and store one or more images from the video feed of the camera. For example, the user may hover the camera function of a user computing device over a financial card and observe the representation of the financial card on the user interface of the user computing device.

The OCR application may perform the OCR process by any suitable processing. The OCR application may extract information from the card, such as the user account number, the user name, the expiration date, or other suitable information. The information from the card may be stored and/or uploaded for use by a digital wallet application module, a POS terminal, an online wallet account, or any suitable user.

The user may use the extracted information to conduct a transaction with a merchant system. For example, the user may open the OCR application and select a payment account to use in the transaction.

To make the process of selecting a payment account easier and more accurate, the OCR application may display the card art associated with the payment account. The card art is obtained from the received images from the OCR process or from a provider of substitute card art.

The OCR application may use one of the stored images from the OCR process to obtain the card art or the OCR application may obtain a new image as described herein. The OCR application selects the clearest and least blurry image available. The clearest image might have the least bright spots and the most contrast to make the card art easily discernable. In another example, at the time of the OCR process, the OCR application or the user may flag an image as a candidate image for the card display.

The OCR application crops the image to display the full card. While the OCR application may have cropped the image to isolate the data on the card during the OCR process, the OCR application may now crop the image to display the full body of the card.

The OCR application saves the cropped image in a storage location on the user computing device or in another suitable storage location.

While displaying the image of the card, the user account information also may be visible on the card. If a person other than the user opened the digital wallet, the user account information would be visible on the face of the card image. Thus, the OCR application redacts the information on the card image to protect the privacy of the user. For example, the user account number and the user name may be obscured either partially or entirely to protect the privacy of the user account.

The OCR application determines during the OCR process where the digits are located and the categories of the groups of digits. For example, the OCR application may extract the digits of the user account number and categorize the group of digits as the user account number.

The user, the OCR system, the payment processing system, or other suitable party may instruct the OCR application which data should be obscured when displaying the card. For example, the user may enter information in a user interface on the user computing device to obscure the account number and the user name from the image of the card. In certain examples, the selection of information to obscure may be performed automatically by the OCR application.

The OCR application may obscure the data on the card image in any suitable manner. For example, the data may be erased, pixilated, blurred, darkened, or in any manner altered to prevent the data from being read via the displayed card image. In an example, the OCR application presents the obscured image to the user for approval. The user may verify that the data on the card is sufficiently obscured, that the card is still identifiable after the obscuring, or verify any other aspect of the card image. The user may indicate an acceptance or rejection of the image.

The image may be displayed as a representation of the card or the financial account. The image may be used at any time that a representation of the card is required. For example, a digital wallet application module may display the card when the user is selecting a card for a purchase. An application on the user device may display the card when the user is attempting to gain access to an event such as a flight or a concert. An application may display the card when the user presents the card as identification. The card image may be transmitted to a POS terminal for display to a merchant operator. The card image may be transmitted to an online merchant during a transaction. The card image may be used for any suitable purpose.

In an example embodiment, the OCR application obtains standard, high quality, substitute card art for display. For example, if a high quality version of the card art is available that does not contain sensitive user data, the OCR application may display the high quality version on the user computing device or in other locations.

The OCR application obtains the image of the card from a camera during the OCR process or at any suitable time. For example, the OCR application may access a card image from a storage location after the OCR process is completed. Any other manner of obtaining a card image as described herein may be utilized. Before locating the standard image, the OCR application may optionally obscure the personal information on the image as described herein.

To obtain substitute card art, the OCR application or another party may transmit the image of the card to an OCR system. The OCR system performs an image recognition algorithm on the card image. The OCR system may use any suitable algorithm, process, method, or other manner of recognizing card images. For example, the OCR system may isolate images, such as card art, within the image of the card and can compare the card art images to a stored database of images to identify matching images. The OCR system may apply an OCR algorithm to one or more words identified in the card art.

The OCR system identifies images, logos, words, icons, pictures, badges, and other features of the art on the card image. The OCR system identifies the card in the image by comparing the identified art to a database of identified art. When the OCR system compares the identified art to a database of images and locates a matching image, the OCR application accesses any data stored with the matching image.

The data stored with the matching images may include an identification of the card type. For example, the OCR system may identify a logo on the card image that matches a logo in the database. The logo may be identified in the database as the logo for a particular bank. In the example, the OCR system may identify the card image as likely being a credit card associated with the particular bank as the issuer of the credit card.

In another example, the OCR system may identify an image that matches an image in the database of an icon or other logo of a particular department store. The icon or other logo may be used to identify the card image as likely being a gift card issued by the particular department store.

In another example, the OCR system may identify a hologram that matches an image in the database that is associated with a particular credit card issuer. The OCR system may recognize the hologram by comparing multiple images from multiple angles with images in the image database. The multiple images may be obtained by extracting one or more images from a continuous scan of the card or by capturing multiple images of the card by moving the camera to multiple angles above the card. If one or more of the images matches the hologram, then the OCR system may identify the card as likely being a credit card issued by the particular credit card issuer.

The OCR system obtains a standard image for the card art. The standard image may be any original and/or high quality card art associated with the card in the image. For example, the OCR system may obtain a version of the art from the issuer of the card that has a higher resolution than the images received from the camera. The card art may be received from the issuers of the associated cards, from a third party card art system, or from any suitable source. The standard image for the card art may be canonical images provide by user. As users may upload card art, the OCR system may obtain the uploaded images and determine that the uploaded images are of a higher quality or have other desirable attributes.

In an example, the OCR system may maintain a database of high quality card art. The card art database may be populated by the OCR system. The card art may be updated on a regular basis to maintain current art for some or all of the issuers of the cards.

In another example, the OCR system may obtain the card art at the time of the analysis of the image. That is, when the OCR system recognizes the card art associated with the image, a request may be transmitted to the issuer of the card or another suitable party for a standard copy of the card art.

In another example, the OCR application transmits the user account information to the OCR system to allow the OCR system to identify the card art. The user account information may be any information necessary to allow the OCR system to identify the card art associated with the card. For example, the first four or six digits of the user account number may be sufficient to allow the OCR system to identify the associated card art. The OCR system may use any other suitable information to identify the card art. The transmitted information may be used to find a suitable match in the database of standard art. The standard art may be obtained from the database or from an issuer of the card.

The OCR system transmits the high quality card art to the OCR application or another application on the user device, such as a digital wallet application module. The OCR application, the digital wallet application module, a POS terminal, or any suitable computing system displays the card art at any time that a representation of the card is needed as described herein.

Example System Architecture

Turning now to the drawings, in which like numerals represent like (but not necessarily identical) elements throughout the figures, example embodiments are described in detail.

Figure 1:
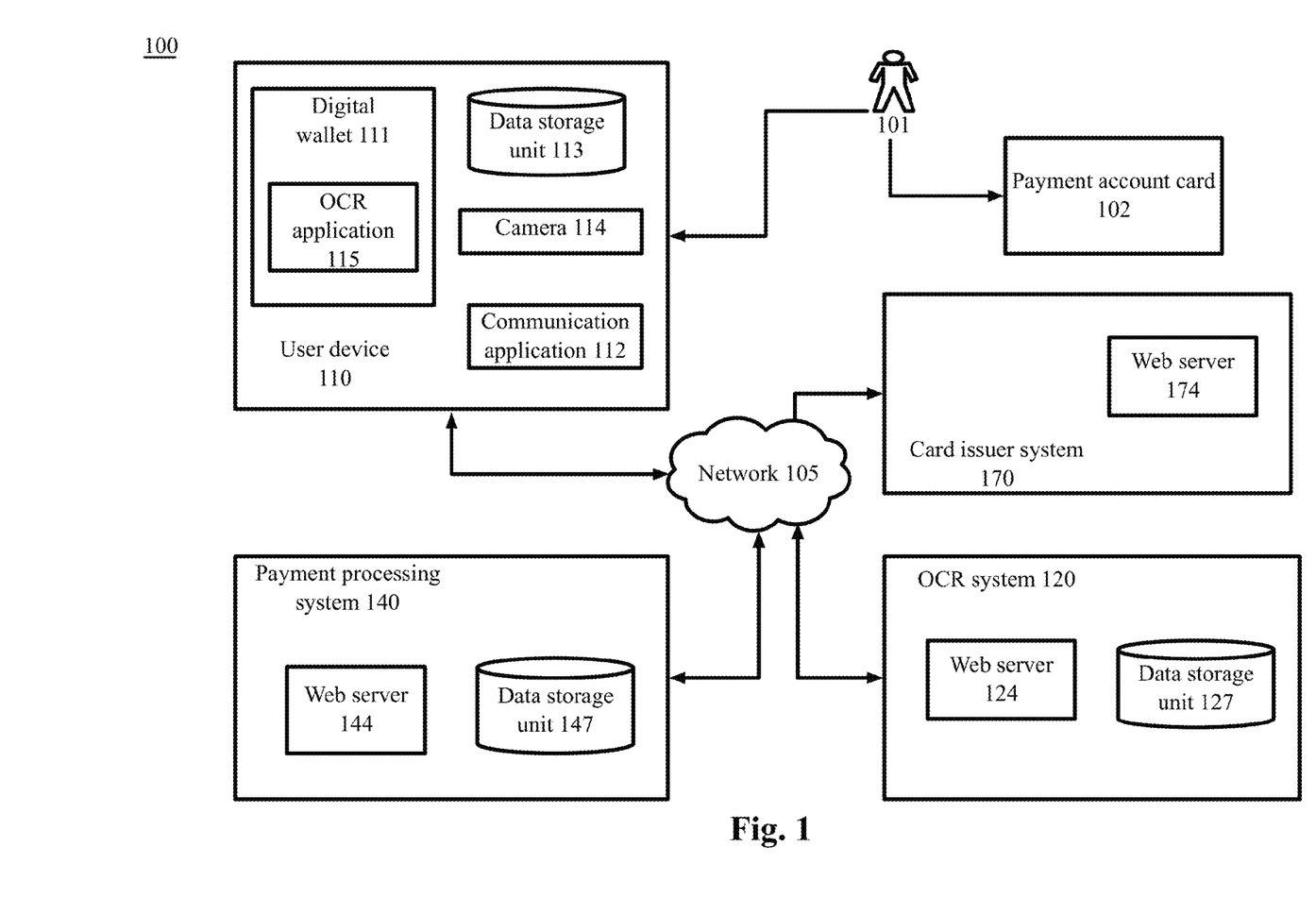
FIG. 1 is a block diagram depicting a system for displaying card art on a user computing device, in accordance with certain example embodiments of the technology disclosed herein.

FIG. 1 is a block diagram depicting a system for extracting financial account information with relaxed card alignment and for extracting financial account information from multiple cards, in accordance with certain example embodiments. As depicted in FIG. 1, the system 100 includes network computing devices 110, 120, 140, and 170 that are configured to communicate with one another via one or more networks 105.

Each network 105 includes a wired or wireless telecommunication means by which network devices (including devices 110, 120, 140, and 170) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network computing device 110, 120, 140, and 170 includes a device having a communication module capable of transmitting and receiving data over the network 105. For example, each network device 110, 120, 140, and 170 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 120, 140, and 170 are operated by end-users or consumers, OCR system operators, payment processing system operators, and card issuer operators, respectively. In certain embodiments, the various operators may have to download an application, activate a feature of an application, and/or otherwise enable an application to take advantage of the features described herein.

The user 101 can use the communication application 112, which may be, for example, a web browser application or a stand-alone application, to view, download, upload, or otherwise access documents or web pages via a distributed network 105. The network 105 includes a wired or wireless telecommunication system or device by which network devices (including devices 110, 120, 140, and 170) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The user device 110 may employ a communication module 112 to communicate with the web server 124 of the OCR system 120 or other servers. The communication module 112 may allow devices to communicate via technologies other than the network 105. Examples might include a cellular network, radio network, or other communication network.

The user computing device 110 may include a digital wallet application module 111. The digital wallet application module 111 may encompass any application, hardware, software, or process the user device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user device 110 may include an optical character recognition ("OCR") application 115. The OCR application 115 can interact with the communication application 112 or be embodied as a companion application of the communication application 112 and execute within the communication application 112. In an exemplary embodiment, the OCR application 115 may additionally or alternatively be embodied as a companion application of the digital wallet application module 111 and execute within the digital wallet application module 111. The OCR application 115 may employ a software interface that may open in the digital wallet application 111 or may open in the communication application 112. The interface can allow the user 101 to configure the OCR application 115 and the user account on the offer provider system 150.

The OCR application 115 can be used to analyze a card and extract information or other data from the card. The OCR system 120 or other system that develops the OCR algorithms or other methods may include a set of computer-readable program instructions, for example, using JavaScript, that enable the OCR system 120 to interact with the OCR application 115.

Any of the functions described in the specification as being performed by the OCR application 115 can be performed by the payment processing system 140, the OCR system 120, the user computing device 110, a merchant system (not pictured) or any other suitable hardware or software system or application.

The user device 110 includes a data storage unit 113 accessible by the OCR application 115 and the communication application 112. The exemplary data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The user device 110 may include a camera 114. The camera may be any module or function of the user computing device 110 that obtains a digital image. The camera 114 may be onboard the user computing device 110 or in any manner logically connected to the user computing device 110. The camera 114 may be capable of obtaining individual images or a video scan. Any other suitable image capturing device may be represented by the camera 114.

The payment processing system 140 includes a data storage unit 147 accessible by the web server 144. The example data storage unit 147 can include one or more tangible computer-readable storage devices. The payment processing system 140 is operable to conduct payments between a user 101 and a merchant system (not pictured). The payment processing system 140 is further operable to manage a payment account of a user 101, maintain a database to store transactions of the merchant system and the user 101, verify transactions, and other suitable functions.

The user 101 may use a web server 144 on the payment processing system 140 to view, register, download, upload, or otherwise access the payment processing system 140 via a website (not illustrated) and a communication network 105). The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101.

A card issuer, such as a bank or other institution, may be the issuer of the financial account being registered. For example, the card issuer may be a credit card issuer, a debit card issuer, a stored value issuer, a financial institution providing an account, or any other provider of a financial account. The payment processing system 140 also may function as the issuer for the associated financial account. The user's 101 registration information is saved in the payment processing system's 140 data storage unit 147 and is accessible the by web server 144. The card issuer employs a card issuer computing system 170 to issue the cards, manage the user account, and perform any other suitable functions. The card issuer system 170 may alternatively issue cards used for identification, access, verification, ticketing, or cards for any suitable purpose. The card issuer system 170 may employ a web server 174 to manage the user account and issue cards 102.

The OCR system 120 utilizes an OCR system web server 124 operating a system that produces, manages, stores, or maintains OCR algorithms, methods, processes, or services. The OCR system web server 124 may represent the computer implemented system that the OCR system 120 employs to provide OCR services to user computing devices 110, merchants, or any suitable part. The OCR system web server 124 can communicate with one or more payment processing systems 140, a user device 110, or other computing devices via any available technologies. These technologies may include, but would not be limited to, an Internet connection via the network 105, email, text, instant messaging, or other suitable communication technologies. The OCR system 120 may include a data storage unit 127 accessible by the web server 124 of the OCR system 120. The data storage unit 127 can include one or more tangible computer-readable storage devices.

Any of the functions described in the specification as being performed by the OCR system 120 can be performed by the OCR application 115, the user computing device 110, or any other suitable hardware or software system or application.

The user 101 may employ the card 102 when making a transaction, such as a purchase, ticketed entry, loyalty check-in, or other suitable transaction. The user 101 may obtain the card information for the purpose of importing the account represented by the card 102 into a digital wallet application module 111 of a computing device 110 or for other digital account purposes. The card 102 is typically a plastic card containing the account information and other data on the card 102. In many card 102 embodiments, the customer name, expiration date, and card numbers are physically embossed on the card 102. The embossed information is visible from both the front and back of the card 102, although the embossed information is typically reversed on the back of the card 102.

It will be appreciated that the network connections shown are exemplary and other means of establishing a communications link between the computers and devices can be used. Moreover, those having ordinary skill in the art having the benefit of the present disclosure will appreciate that the user device 110, OCR system 120, payment processing system 140, and card issuer system 170 illustrated in FIG. 1 can have any of several other suitable computer system configurations. For example, a user device 110 embodied as a mobile phone or handheld computer may not include all the components described above.

Example Processes

Figure 2:
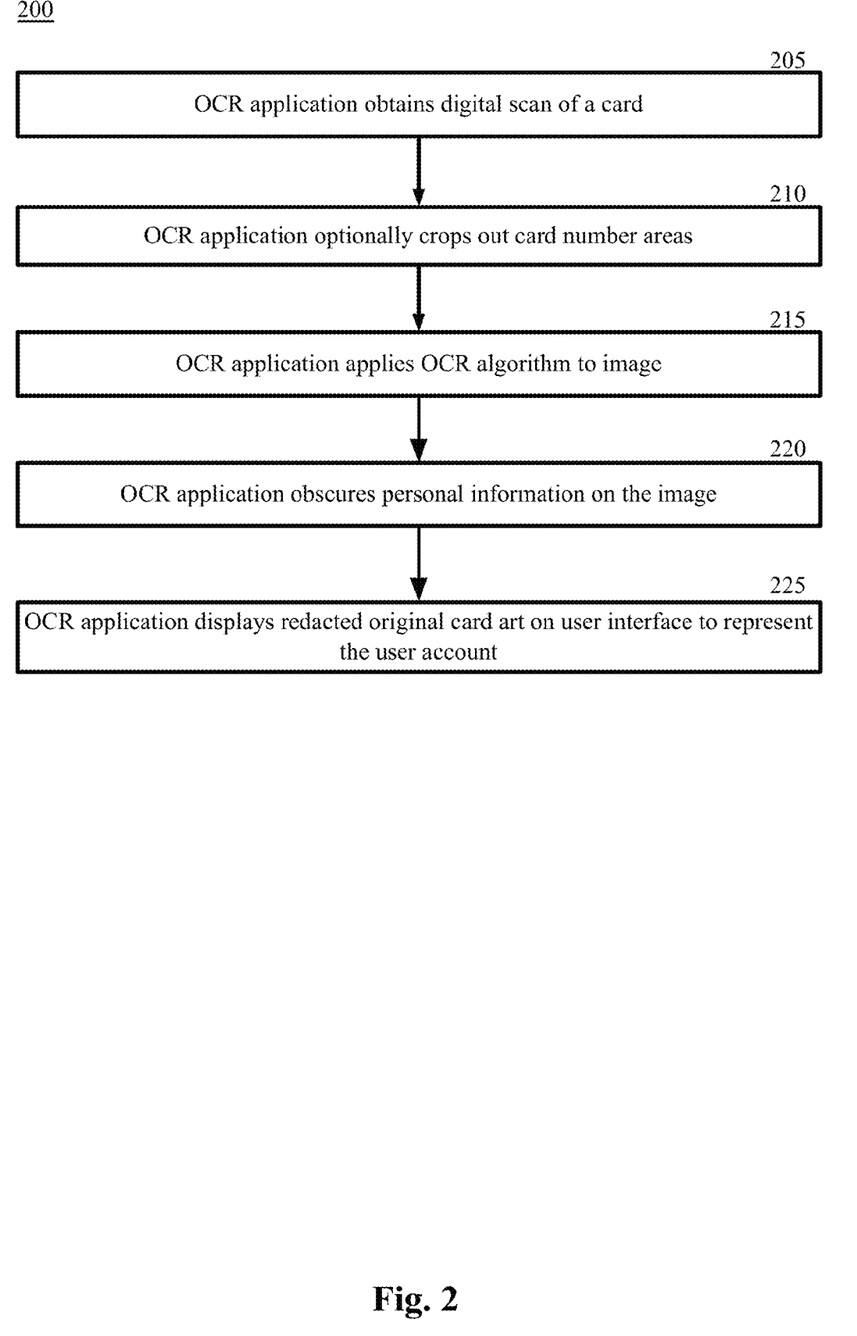
FIG. 2 is a block flow diagram depicting methods for displaying card art on a user computing device with redacted user information, in accordance with certain example embodiments.
Figure 3:
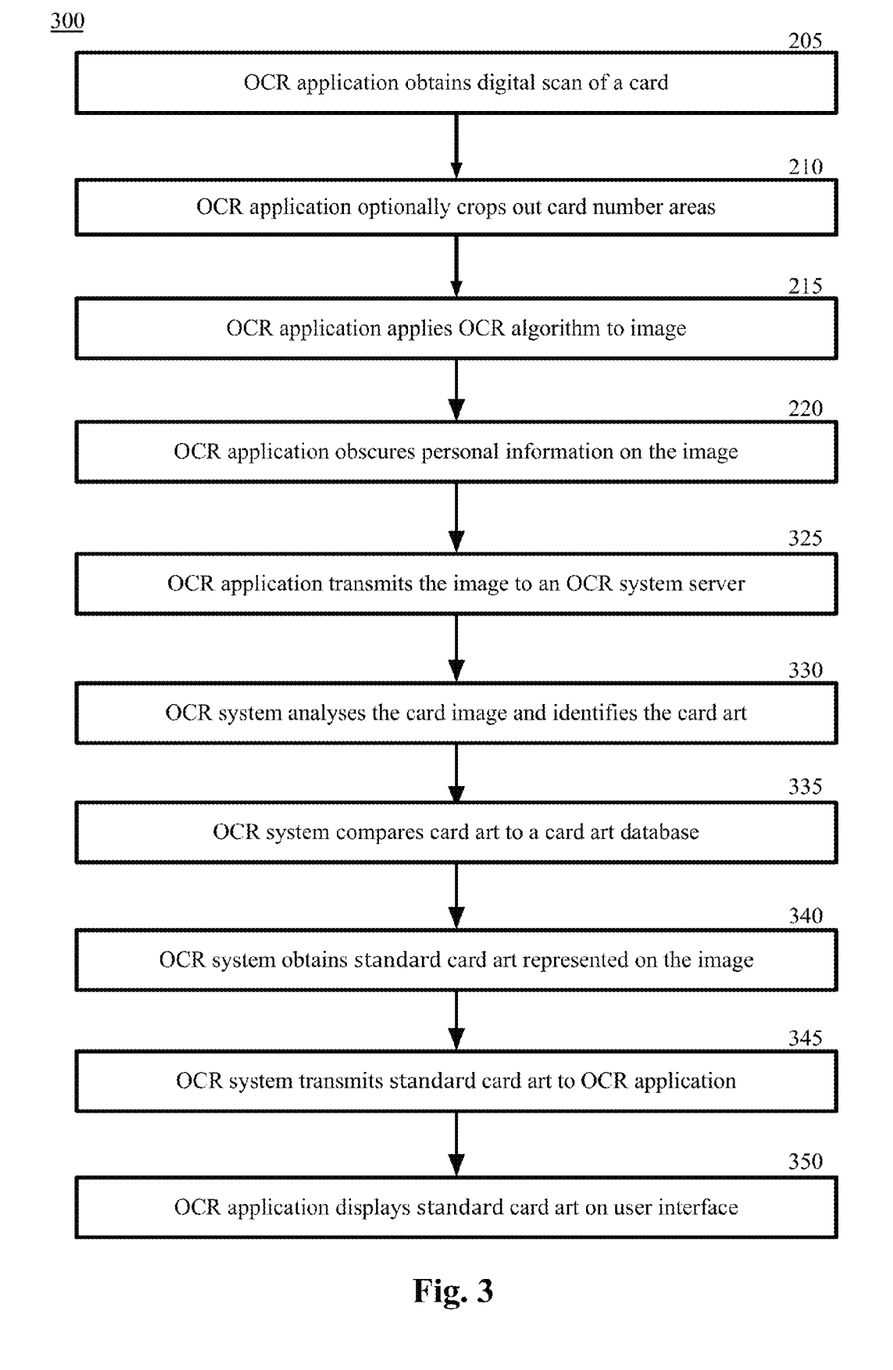
FIG. 3 is a block flow diagram depicting methods for displaying high quality images of card art on a user computing device, in accordance with certain example embodiments.

The example methods illustrated in FIG. 2-3 are described hereinafter with respect to the components of the example operating environment 100. The example methods of FIG. 2-3 may also be performed with other systems and in other environments.

FIG. 2 is a block flow diagram depicting a method 200 for displaying card art on a user computing device 110 with redacted user information, in accordance with certain example embodiments.

With reference to FIGS. 1 and 2, in block 205, the optical character recognition ("OCR") application 115 on the user device 110 obtains a digital scan of a card 102. The user 101 employs a mobile phone, digital camera, or other user computing device 110 to capture an image of the card 102 associated with the account that the user 101 desires to input into the user computing device 110.

The OCR application 115 on the user computing device 110 receives the image of the card 102. The image may be obtained from the camera module of the user computing device 110, such as the camera 114 on a mobile phone. The image may be obtained from a scanner coupled to the user computing device 110 or any other suitable digital imaging device. The image may be obtained from video captured by the user computing device 110. The image may be accessed by the OCR application 115 on the user computing device 110 from a storage location on the user computing device 110, from a remote storage location, or from any suitable location. All sources capable of providing the image will be referred to herein as a "camera" 114.

The functions of the OCR application 115 may be performed by any suitable module, hardware, software, or application operating on the user computing device 110. Some, or all, of the functions of the OCR application 115 may be performed by a remote server or other computing device, such as the server operating in an OCR system 120. For example, a digital wallet application module 111 on the user computing device 110 may obtain the images of the card and transmit the images to the OCR system 120 for processing. In another example, some of the OCR functions may be conducted by the user computing device 110 and some by the OCR system 120 or another remote server. Examples provided herein may indicate that many of the functions are performed by an OCR application 115 on the user computing device 110, but some or all of the functions may be performed by any suitable computing device.

The image is presented on the user interface of the user computing device 110 as a live video image of the card 102. The OCR application 115 can isolate and store one or more images from the video feed of the camera 114. For example, the user 101 may hover the camera 114 function of a user computing device 110 over the card 102 and observe the representation of the card on the user interface of the user computing device 110.

In block 210, the OCR application 115 may crop the image to display only the desired information from the card 102. For example, if the card 102 in the image is a credit card, the OCR application 115 accesses information associated with the expected location of the account number of a credit card. The expected location may be obtained from a database of card layouts stored on the user computing device 110 or in another suitable location. Credit cards, driver's licenses, loyalty cards, and other cards typically meet an industry standard or a particular issuer standard for the data locations and the layout of the card. The standards may be stored in the OCR application 115 or in a location accessible by the OCR application 115. In certain circumstances, the data locations may be provided by the issuer of the card 102.

Figure 4:
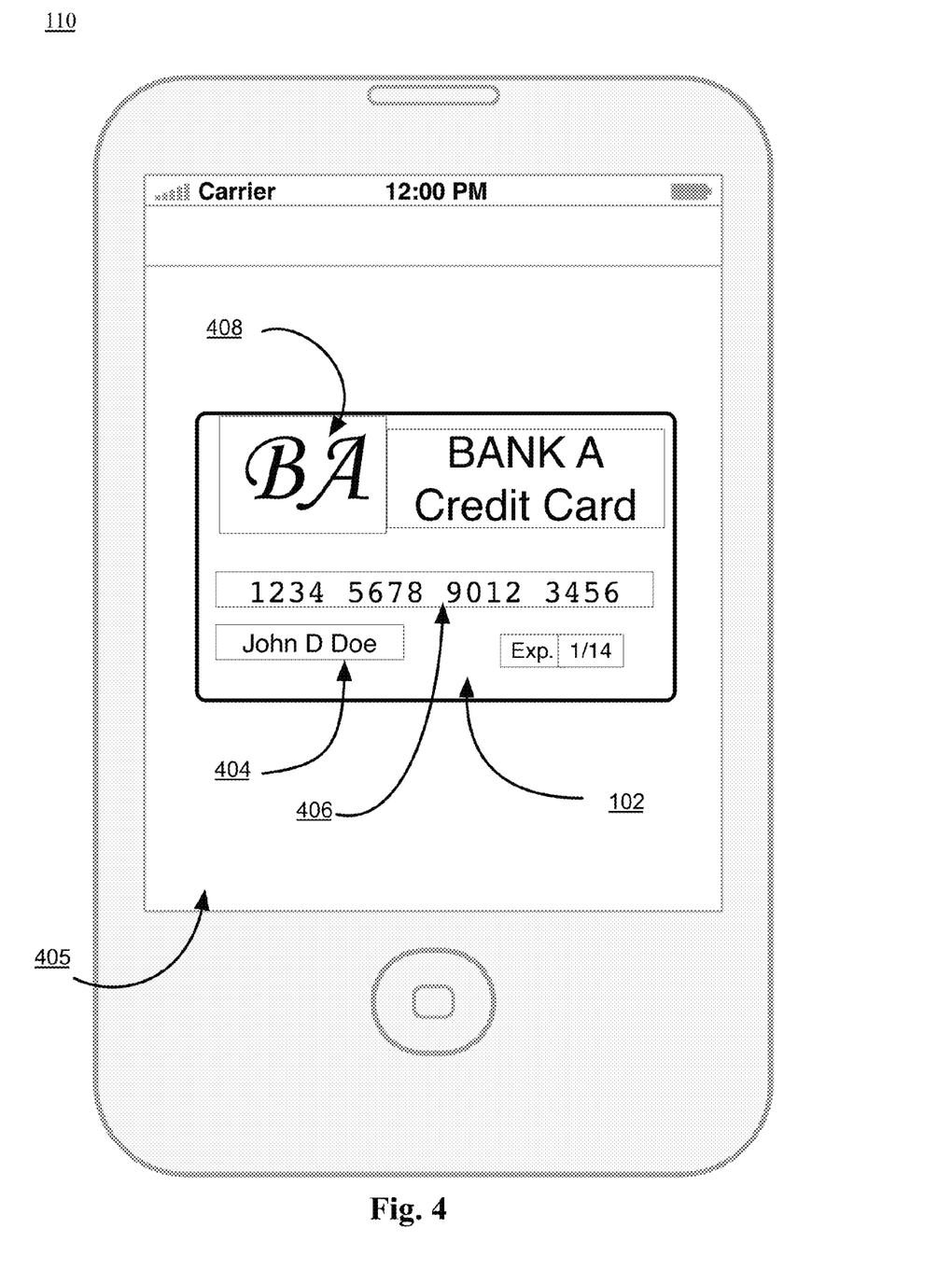
FIG. 4 is an illustration of a user computing device displaying a credit card image, in accordance with certain example embodiments.

An illustration of the card 102 displayed on the user computing device is presented in FIG. 4.

FIG. 4 is an illustration of a user computing device 110 displaying an image of a financial card 102, in accordance with certain example embodiments. The user computing device 110 is shown as a mobile smartphone. The user computing device 110 is shown with a display screen 405 as a user interface. The card 102 is shown displayed on the user computing device 110. The card 102 is shown displaying a name 404 and a user identification number 406. The card 102 additionally displays a logo 410 for the card issuer system 170, the associated bank, or any suitable party.

In block 215, the OCR application performs an OCR algorithm on the image. The OCR application 115 performs an OCR algorithm or other computer implemented process to determine the card information. In an example, the OCR application 115 may use an OCR algorithm to analyze the digit locations in the image of the card 102 to extract the account number of a credit card. The extracted number may be presented to (or provided for display to) the user 101 for verification, stored in the OCR application 115, transmitted to a remote computer, stored in a digital wallet application module 111, or used in any suitable manner. Other information, such as the name, expiration date, security code, or any suitable information, may also be extracted from the image.

In block 220, the OCR application 115 obscures personal information on the card image. While displaying the image of the card 102, the user account information also may be visible on the image. In an example, if a person other than the user 101 opened the digital wallet application module 111, the user account information would be visible on the face of the card image. Thus, the OCR application 115 redacts the information on the card image to protect the privacy of the user 101. For example, the user account number and the name may be obscured either partially or entirely to protect the privacy of the user account.

The OCR application 115 determines during the OCR process where the digits are located and the categories of the groups of digits. For example, the OCR application 115 may extract the digits of the user account number and categorize the group of digits as the user account number.

The user 101, the OCR system 120, the payment processing system 140, or other suitable party may instruct the OCR application 115 which data should be obscured when displaying the card 102. For example, the user 101 may enter information into a user interface on the user computing device 110 to obscure the account number and the name from the image of the card 102. In certain examples, the selection of information to obscure may be performed automatically by the OCR application 115.

The OCR application 115 may obscure the data on the card image in any suitable manner. For example, the data may be erased, pixilated, blurred, darkened, or in any manner altered to prevent the data from being read via the displayed card image. In an example, the OCR application presents the obscured image to the user for approval. The user may verify that the user data on the card is sufficiently obscured, that the card is still identifiable after the obscuring, or verify any other aspect of the card image. The user 101 may indicate an acceptance or rejection of the image. If the user rejects the image, the process may terminate or repeat from an earlier block, such as block 205 (not pictured in FIG. 2).

In block 225, the OCR application 115 displays redacted original card image on user interface to represent the user account. The card image may be displayed as a representation of the card 102 or the financial account. The card image may be used at any time that a representation of the card 102 or account is required. For example, a digital wallet application module 111 may display the card image when the user 101 is selecting an account for a purchase. An application on the user device 110 may display the card image when the user 101 is attempting to gain access to an event such as a flight or a concert. An application may display the card image when the user 101 presents the card as identification. The card image may be transmitted to a POS terminal for display to a merchant operator. The card image may be transmitted to an online merchant during a transaction. The card image may be used for any suitable purpose.

Figure 5:
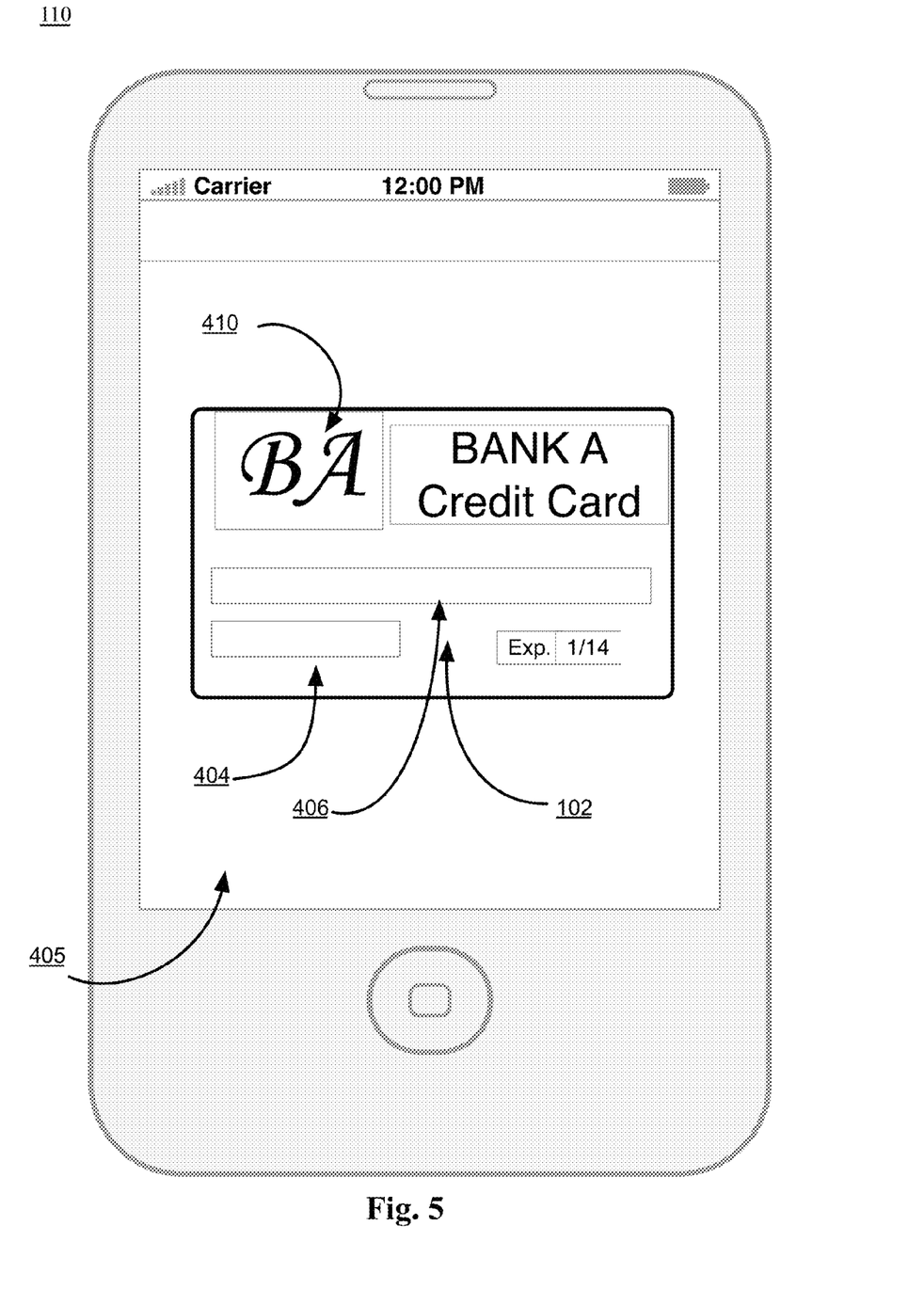
FIG. 5 is an illustration of a user computing device displaying a redacted credit card image, in accordance with certain example embodiments.

FIG. 5 is an illustration of a user computing device displaying a redacted credit card image, in accordance with certain example embodiments. The user computing device 110 is shown as a mobile smartphone. The user computing device 110 is shown with a display screen 405 as a user interface. The card 102 is shown displayed on the user computing device 110. The card 102 is shown with the name 404 and the user identification number 406 redacted. The card 102 displays a logo 410 for the card issuer system 170.

The logo 410 is not redacted because the logo 410 is needed for card 102 identification, but does not provide personal user information.

FIG. 3 is a block flow diagram depicting a method 300 for displaying high quality images of card art on a user computing device 110, in accordance with certain example embodiments. The OCR application 115 obtains standard, high quality, substitute card art for display. For example, if a high quality, generic version of the card art is available that does not contain sensitive user data, the OCR application may display the high quality version on the user computing device or in other locations.

Blocks 205, 210, 215, and 220 of FIG. 3 are performed as described in blocks 205, 210, 215, and 220 of FIG. 2.

In block 325, the OCR application 115 transmits the image to a web server 124 of the OCR system 120. The image may be transmitted to the OCR system 120 via an Internet connection over the network 105, email, text, or via any suitable technology. While described herein as being performed by the OCR system 120, the functions of obtaining the standard card art may be performed by any suitable party, such as the OCR application 115, the payment processing system 140, or the card issuer system 170.

In block 330, the OCR system 120 performs an image recognition algorithm on the card image. The OCR system 120 may use any suitable algorithm, process, method, or other manner of recognizing card images. For example, the OCR system 120 may isolate images, such as a logo, within the image of the card 102 and compare the card art images to a stored database of images to identify matching images. The OCR system 120 may apply an OCR algorithm to one or more words identified in the card art.

The OCR system 120 identifies images, logos, words, icons, pictures, badges, and other features of the art on the card image.

In block 335, the OCR system 120 identifies the card in the image by comparing the identified art to a database of identified art. When the OCR system 120 compares the identified art to a database of images and locates a matching image, the OCR system 120 accesses any data stored with the matching image.

The data stored with the matching images may include an identification of the card type. For example, the OCR system 120 may identify a logo on the card image that matches a logo in the database. The logo may be identified in the database as the logo for a particular bank. In the example, the OCR system 120 may identify the card image as likely being a credit card associated with a particular bank associated with the card issuer system 170.

In another example, the OCR system 120 may identify an image that matches an image in the database of an icon or other logo of a particular department store. The icon or other logo may be used to identify the card image as likely being a gift card issued by the particular department store.

In another example, the OCR system 120 may identify a hologram that matches an image in the database that is associated with a particular credit card issuer. The OCR system 120 may recognize the hologram by comparing multiple images from multiple angles with images in the image database. The multiple images may be obtained by extracting one or more images from a continuous scan of the card or by capturing multiple images of the card by moving the camera to multiple angles above the card. If one or more of the images matches the hologram, then the OCR system 120 may identify the card as likely being a credit card issued by the particular credit card issuer.

In block 340, the OCR system 120 obtains a standard image for the card art. The standard image may be any original and/or high quality card art associated with the card 102 in the image. For example, the OCR system 120 may obtain a version of the art from the card issuer system 170 that issued the card 102 that has a higher resolution than the images received from the camera 114. The card art may be received from the issuers 170 of the associated cards, from a third party card art system, or from any suitable source.

In an example, the OCR system 120 may maintain a database of high quality card art. The card art database may be populated by the OCR system 120. The card art may be updated on a regular basis to maintain current art for some or all of the issuers of the cards 102.

In another example, the OCR system 120 may obtain the card art at the time of the analysis of the image. That is, when the OCR system 120 recognizes the card art associated with the image, a request may be transmitted to the card issuer system 170 that issued the card or another suitable party for a standard copy of the card art.

In another example, the OCR application 115 transmits the user account information to the OCR system 120 to allow the OCR system 120 to identify the card art. The user account information may be any information necessary to allow the OCR system 120 to identify the card art associated with the card 102. For example, the first four or six digits of the user account number may be sufficient to allow the OCR system 120 to identify the associated card art. The OCR system 120 may use any other suitable information to identify the card art. The transmitted information may be used to find a suitable match in the database of standard art. The standard art may be obtained from the database or from the card issuer system 170.

In block 345, the OCR system 120 transmits the standard card art to the OCR application 115 or another application on the user device 110, such as a digital wallet application module 111 for display.

In block 350, the OCR application 115 displays the standard card image on a user interface to represent the user account. The card image may be displayed as a representation of the card 102 or the financial account. The card image may be used at any time that a representation of the card 102 or account is required. For example, a digital wallet application module 111 may display the card image when the user 101 is selecting an account for a purchase. An application on the user device 110 may display the card image when the user 101 is attempting to gain access to an event such as a flight or a concert. An application may display the card image when the user 101 presents the card as identification. The card image may be transmitted to a POS terminal for display to a merchant operator. The card image may be transmitted to an online merchant during a transaction. The card image may be used for any suitable purpose.

Other Example Embodiments

Figure 6:
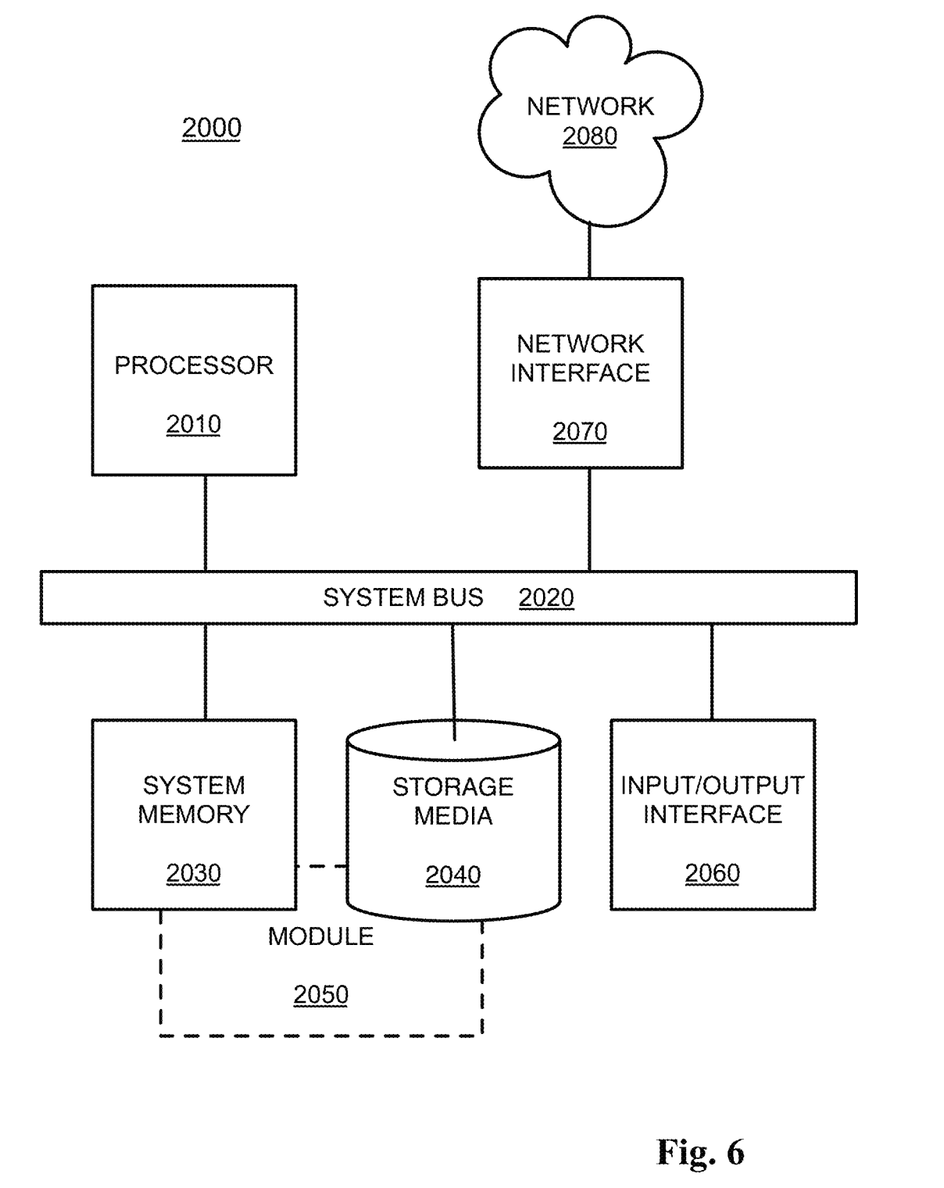
FIG. 6 is a block diagram depicting a computing machine and a module, in accordance with certain example embodiments.

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to provide card art for display, comprising:
   receiving, by one or more computing devices and from a user computing device, a plurality of digital images of a card;
   selecting, by one or more computing devices, a particular digital image of the card from the plurality of digital images of the card;
   identifying, by the one or more computing devices, a card art image comprising a particular region of the particular digital image of the card using an image recognition algorithm;
   comparing, by the one or more computing devices, the identified card art image to a plurality of standard card art images in an image database to identify a particular standard card art image that matches the identified card art image, wherein each standard card art image in the image database is associated with one or more of a plurality of standard images of cards;
   determining, by the one or more computing devices, a particular standard image of a card associated with the identified particular standard card art image based at least in part on the comparison;
   associating, by the one or more computing devices, the particular standard image of the card with a particular account of a user, the account being associated with the card represented in the particular digital image received from the user computing device; and
   providing for display, by the one or more computing devices and via the user computing device, the particular standard image of the card as a representation of the account.

2. The method of claim 1, wherein the particular standard image of the card is displayed on a digital wallet application of the user computing device.

3. The method of claim 1, wherein the particular standard image of the card and the plurality of standard card art images are obtained from an issuer of the card associated with the digital image.

4. The method of claim 1, further comprising storing, by the one or more computing devices, the particular standard image of the card and the plurality of standard card art images in the image database.

5. The method of claim 1, further comprising transmitting, by the one or more computing devices, the particular standard image of the card to a merchant computing device.

6. The method of claim 1, further comprising:
   performing, by the one or more computing devices, an optical character recognition on the card art image to determine the card type;
   determining, by the one or more computing devices, a particular standard card art image associated with the identified image based at least in part on a comparison of one or more words on the card art image with data associated with the particular standard card art image in the database; and
   identifying, by the one or more computing devices, the particular standard image of the card associated with the determined particular standard card art image associated with the identified card art image, wherein each standard card art image is associated with a particular standard image of a card.

7. The method of claim 1, wherein the card represented in the digital image comprises a credit card, a debit card, an identification card, a loyalty card, or an access card.

8. A computer program product, comprising:
   a non-transitory computer-executable storage device having computer-readable program instructions embodied thereon that when executed by a computer cause the computer to provide improved card art for display, the computer-readable program instructions comprising:
   computer-readable program instructions to receive a digital image of a card; computer-readable program instructions to identify a card art image comprising a region of the digital image of the card using an image recognition algorithm;
   computer-readable program instructions to compare the identified card art image to a plurality of standard card art images in an image database to identify a particular standard card art image that matches the identified card art image, wherein each standard card art image in the image database is associated with one or more of a plurality of standard images of cards;
   computer-readable program instructions to determine a particular standard image of a card received from an issuer system associated with the card, the particular standard image of the card being associated with the identified particular standard card art image based at least in part on the comparison;
   computer-readable program instructions to associate the particular standard image of the card received from the issuer system with an account of a user, the account being associated with the card in the digital image; and computer-readable program instructions to communicate for display the particular standard image of the card as a representation of the account.

9. The computer program product of claim 8, wherein the particular standard image of the card is displayed on a digital wallet application module of the user.

10. The computer program product of claim 8, wherein the particular standard image of the card and the plurality of standard card art images are obtained from an issuer of the card associated with the digital image.

11. The computer program product of claim 8, further comprising computer-readable program instructions to store the particular standard image of the card and the plurality of standard card art images in the image database.

12. The computer program product of claim 8, further comprising computer-readable program instructions to transmit the particular standard image of the card to a merchant computing device.

13. The computer program product of claim 8, further comprising:
   computer-readable program instructions to perform an optical character recognition on the card art image to determine the card type;
   computer-readable program instructions to determine a particular standard card art image associated with the identified card art image based at least in part on a comparison of one or more words on the identified card art image with data associated with the particular standard card art image in the database; and
   computer-readable program instructions to identify the particular standard image of the card associated with the determined standard card art image associated with the identified card art image, wherein each standard card art image is associated with a particular standard image of a card.

14. The computer program product of claim 8, wherein the card represented in the digital image comprises a credit card, a debit card, an identification card, a loyalty card, or an access card.

15. A system to provide improved card art for display, comprising:
   a storage device;
   a processor communicatively coupled to the storage device, wherein the processor is configured to execute computer-readable instructions that are stored in the storage device to cause the system to:
   receive a digital image of a card;
   identify a card art image comprising a region of the digital image of the card using an image recognition algorithm;
   compare the identified card art image to a plurality of standard card art images in an image database to identify a particular standard card art image that matches the identified card art image, wherein each standard card art image in the image database is associated with one or more of a plurality of standard images of cards;
   determine a particular standard image of a card associated with the identified particular standard card art image based at least in part on the comparison;
   associate the particular standard image of the card with an account of a user, the account being associated with the card in the digital image; and
   provide for display the particular standard image of the card as a representation of the account.

16. The system of claim 15, wherein the particular standard image of the card is displayed on a digital wallet application of the user.

17. The system of claim 15, wherein the plurality of standard card art images and the particular standard image of the card are obtained from an issuer of the card.

18. The system of claim 15, the processor further configured to execute application code instructions that are stored in the storage device and that cause the system to store the plurality of standard card art images and the particular standard image of the card in the image database.

19. The system of claim 15, the processor further configured to execute application code instructions that are stored in the storage device and that cause the system to:
   perform an optical character recognition on the card art image to determine the card type;
   determine a particular standard card art image associated with the identified card art image based at least in part on a comparison of one or more words on the identified card art image with data associated with the particular standard card art image in the database; and
   identify the particular standard image of the card associated with the determined standard card art image associated with the identified card art image, wherein each standard card art image is associated with a particular standard image of a card.

20. The system of claim 15, wherein the card represented in the digital image comprises a credit card, a debit card, an identification card, a loyalty card, or an access card.

* * * * *